Feb. 5, 1957        B. T. BALLINGTON        2,780,719
ELECTRODE HOLDERS FOR HAND-WELDING
Filed Nov. 14, 1955

Inventor
Bernard T. Ballington

By
Watson, Cole, Grindle & Watson
Attorneys

United States Patent Office 2,780,719
Patented Feb. 5, 1957

2,780,719

ELECTRODE HOLDERS FOR HAND-WELDING

Bernard T. Ballington, Sheffield, England, assignor to English Steel Corporation Limited, Sheffield, England Application November 14, 1955, Serial No. 546,641

5 Claims. (Cl. 219—138)

This invention relates to electrode holders for hand-welding, and particularly for use with heavy electrodes and correspondingly heavy welding current.

The principle of the invention is to provide a holder that remains relatively cool, in spite of the heat generated by the flow of current to the electrode, so as to permit of consecutive application of a larger number of electrodes than usual before becoming too hot to hold.

A further object is to provide a holder that is little prone to damage by burning when the last portion of an electrode is being applied, and also provides for ready replacement of a part of the holder that is adequate to support an electrode and to conduct the necessary current to the electrode, when such holder does become damaged in this way.

According to the present invention, an electrode holder for hand-welding comprises an elongated metal carrier, a heat-insulated hand-grip in continuation of the carrier, and a conducting gripper on the carrier at the end remote from the hand-grip, the carrier being formed with fins for the dissipation of heat tending to flow by conduction through the carrier between the gripper end and the hand-grip end. Because of the very considerable increase of area provided by fins, as compared with that of a carrier of section merely sufficient for the mechanical duty of supporting the electrode at a point remote from the hand-grip, an amount of heat that would otherwise rapidly make holding the hand-grip unendurable, despite its insulation, passes largely to the ambient air, and so little reaches the hand-grip that the holder may be kept in use for protracted periods, even when very heavy electrodes are being used.

The cooling effect may be increased by having the carrier hollow, with openings to permit an internal lengthwise flow of cooling air, which may be induced or positively supplied from an outside source of air.

Other objects and advantages will appear from the subsequent description of the holder illustrated in the accompanying drawings, in which.

Figure 1:
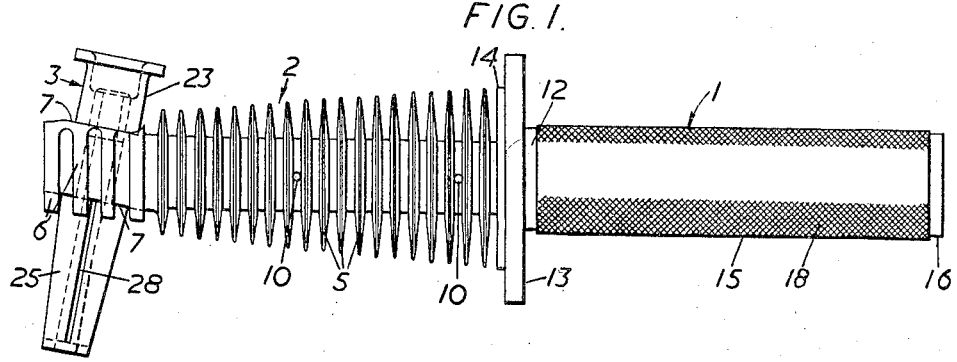
Figure 1 is a side elevation of an electrode holder fitted with one form of gripper at the end of the finned carrier.
Figure 2:
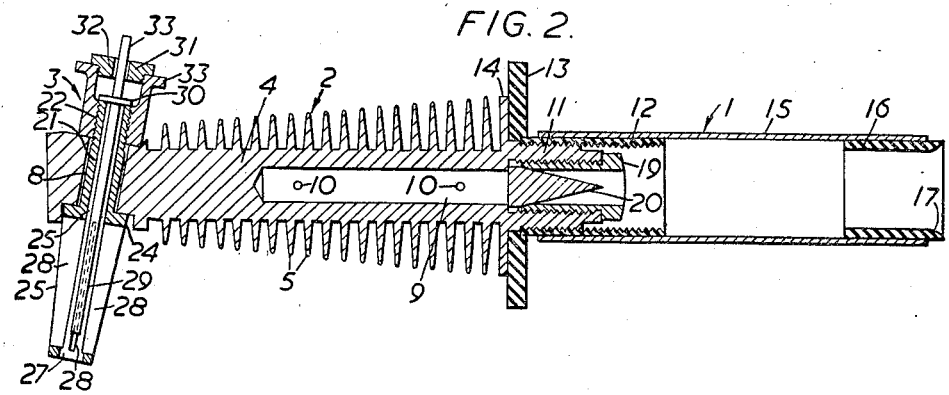
Figure 2 is a longitudinal section corresponding to Figure 1.

In Figures 1 and 2, a hand-grip is shown generally at 1, a carrier at 2, and a gripper at 3. The carrier 2 comprises a body 4, preferably of light metal such as aluminum to minimise the weight of the holder, with tapered cooling fins 5, advantageously integral, but not necessarily so, over most of its length, and further fins 6 at its far end, where parallel faces 7 are formed at the ends of a transverse bore 8 making an angle of about 10° or 15° to the axis of the body 4. The body has a lengthwise bore 9, and holes 10 pass from that bore to between the fins 5 to provide for an induced flow of cooling air, or a forced flow by connecting one of the holes 10 to a supply of pressure air.

An extension 11 of the body 4 is threaded externally to receive a sleeve 12 of heat- and electrical-insulating material that serves to nip an insulating disc 13 against the end 14 of the body. A tube 15 is pushed on to the sleeve 12 and a second sleeve 16 is pushed into the other end of the tube 15, with its end protruding slightly and flared internally as shown at 17. The tube 15 is preferably of light metal; and, to assist in dissipating heat, is externally knurled over its whole length, as shown at 18, it having been found that this expedient produces a noticeable lowering of the temperature at the surface of the tube. Again, ribbed or perforated tube may be used to assist in dissipating heat.

The extension 11 is internally threaded to receive a screwed thimble 19, which, with a loose conical member 20, provides for the connection of a supply cable (not shown) to the body 4, the cable being led loosely through the sleeve 16 and tube 15.

With the holder in use, the flow of current to the electrode held in the gripper 3 produces considerable heat at the gripper end of the holder, particularly with heavy electrodes, but the fins 5, 6 dissipate this so rapidly that but a very small proportion of the heat reaches the threaded extension 11 within the hand-grip. A comparative test has shown that whereas the usual pincer-type holder became unbearably hot to an operator using leather gloves, reinforced by a wrapping of hessian round the handgrips, when only half-way through the third consecutive heavy electrode, the holder of the invention could be used for as many as ten like electrodes, with the operator gripping the hand-grip 1 directly with his leather glove.

In addition to heat conducted backwards from the gripper end, there is also the heating effect of the current internally of the hand-grip 1, but the hollow formed within the tube 15 and the heat-dissipating surface of that tube permit uninterrupted working runs of the order indicated, because the fins 5, 6 do not permit any substantial contribution of heat from the gripper end to be added to the heat generated within the hand-grip.

The bore 8 in the body 4 receives the shank 21 of the gripper 3, the shank being threaded at 22 for a nut 23, by means of which a shoulder 24 on a projecting nose 25 is pulled against the lower face 7. A lengthwise bore 26 through the shank 21 and nose 25 has a diameter that provides a tight fit for the core of a coated electrode (see Figure 3 for an indication of an electrode), except for a slight enlargement 27 at the tip of the nose 25. The nose is provided with a number of slits 28, which provide some resiliency for the electrode core when it is pushed into the bore 26. The slits 28 are shown parallel to the axis of the bore 26; they may, however, be somewhat inclined to it. Only a short length of electrode core need be bared to enable it to be gripped in the bore 26. In some welding positions (i. e., other than directly downhand), it is not even necessary for the core to be gripped, and in such cases there is extra latitude as to the diameter of cores that may be used with any particular gripper.

The simple, substantial nature of the gripper 3 and of its connection to the carrier 2 permits of quenching of these parts when very protracted welding does make the hand-grip hot enough to seem uncomfortable, so that welding can continue after momentary interruption for such quenching.

The gripper 3 may be exchanged for another with another diameter of bore 26, as may be required for different electrodes. It may also be quickly (and cheaply) replaced if it becomes damaged in use, as it may, because of the intense heat that builds up in the electrode, particularly when it has burnt short, i. e., by the very heat that makes normal electrode-holders too hot after short runs, but substantially overcome by the fins 5, 6 provided by the invention.

Electrode stubs may be readily removed by the captive ejector rod 29 (Figure 2), which has a collar 30 providing for limited movement with respect to a retaining nut 31 bored at 32 for the upper end 33 of the rod 29 to protrude. The rod 29 is pushed upwards when the core of an electrode is inserted, but may be driven down (e. g., by inverting the holder and striking the end 33) to eject the stub.

With a gripper 3 as in Figures 1 and 2, the electrode axis intersects the axis of the body 2 and hand-grip 1, which enables the operator to "sight" the electrodes readily with respect to the work. For some purpose, application of the electrode may be facilitated by having the bore 8 make a sharper angle to the axis of the body 4.

Figure 3:
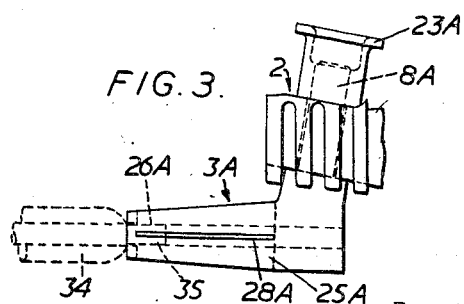
Figure 3 is a side elevation of another form of gripper.

The modified gripper 3A shown in Figure 3 enables the holder to be used to present electrodes at different angles from what is possible with the gripper 3 of Figures 1 and 2. The shank 8A (which may now be solid) and nut 23A provide for interchange of grippers, as before, but the nose 25A makes a pronounced angle to the shank. An electrode 34 may thus be directed generally in line with the holder, its bare core end 35 being pushed into the bore 26A to be gripped by the resilience provided by the slits 28A (if provided). The shank 8A may be rotated with respect to the carrier 2 to enable the electrode to be presented in a variety of directions. Electrode stubs may be removed by pushing a rod through the bore 26A, or an ejector much as in Figure 2 may be provided.

The invention is not limited to the connection of the supply cable within the hand-grip 1; it may be connected directly to the gripper, e. g., to the nut 23 or 23A.

The invention thus provides a holder of robust character, suitable for gripping the heaviest electrodes capable of being applied by hand-welding, yet of modest weight and size, with a hand-grip that not only tends to dissipate heat but receives very little heat from the gripper end, even with protracted runs using heavy electrodes.

What I claim is:

1. An electrode holder for hand-welding comprising an elongated metal carrier, a heat-insulated hand-grip in continuation of the carrier, a conducting gripper on the carrier at the end remote from the hand-grip, the carrier being formed with fins for the dissipation of heat tending to flow by conduction through the carrier between the gripper end and the hand-grip end, and a tube forming the hand grip, the tube being connected to the carrier through an insulating sleeve.

2. An electrode holder as in claim 1 wherein the hand-grip tube is of metal, externally roughened to dissipate heat.

3. An electrode holder for hand-welding comprising an elongated metal carrier, a heat-insulated hand-grip in continuation of the carrier, and a conducting gripper on the carrier at the end remote from the hand-grip, the carrier being formed with fins for the dissipation of heat tending to flow by conduction through the carrier between the gripper end and the hand-grip end, and the gripper being a tube with a shank removably fitting a transverse bore in the carrier.

4. An electrode holder as in claim 3, wherein the bore of the gripper tube is slitted to provide a resilient grip for the electrode.

5. An electrode holder as in claim 3, wherein the gripper tube is provided with a captive rod for the ejection of electrode stubs.

References Cited in the file of this patent

UNITED STATES PATENTS

| | | |
|---|---|---|
| 1,705,884 | Wells | Mar. 19, 1929 |
| 2,147,981 | Kuehl | Feb. 21, 1939 |
| 2,184,980 | Smith | Dec. 26, 1939 |
| 2,221,422 | Kuehl | Nov. 12, 1940 |
| 2,322,077 | Wells | June 15, 1943 |
| 2,372,251 | Checkos | Mar. 27, 1945 |
| 2,389,938 | Smith | Nov. 27, 1945 |
| 2,407,836 | Ketelby et al. | Sept. 17, 1946 |
| 2,418,681 | Wells | Apr. 8, 1947 |